United States Patent Office 3,241,978
Patented Mar. 22, 1966

3,241,978
PROCESS FOR PRODUCING A QUICK-COOKING
OAT PRODUCT
Bohdan Hreschak, Hawthorne, N.J., assignor to National
Biscuit Company, a corporation of New Jersey
No Drawing. Filed Nov. 20, 1963, Ser. No. 325,183
11 Claims. (Cl. 99—80)

This invention is a continuation-in-part of Serial No. 140,245, filed September 25, 1961, now abandoned.

This invention relates to a process for the preparation of cereal grains for use as quick-cooking cereals, to the end that the products may be converted into a form ideal for ready digestion by a very short cooking period.

This invention has particular application to the production of palatable oat cereal products, although the invention is not limited to oat products but may be employed for the production of a variety of cereal products and to mixtures of different cereals.

Many cereal grains have been successfully and extensively used for the preparation of either ready-to-eat or quick-cooking cereal foods. The cereal material is cooked first, and then subjected to shredding or puffing or flaking.

The cooking step of the cereal products is necessary to bring about gelatinization of the the starch granules plus hydration, which may also be accompanied by denaturation of the proteins. Gelatinization involves the swelling or expansion of the outer covering which encloses the starch particles, thus making the particles more easily digestible. The hydration, usually accompanied by denaturation, is beneficial to break some of the protein chains and to render the proteins more digestible. Thus cooking is necessary to make the products digestible, through the mechanisms of gelatinization and hydration.

Cooking is also important to develop the taste, texture, and mouth feel which are associated with cooked products.

The conventional processes of cooking, followed by puffing or shredding or flaking, are usually satisfactory for most cereals. It has been more difficult, however, to adapt the same processes to oat cereals, and whenever oat cereals have been subjected to cooking, and then flaking, the oat products exhibit properties different from other grains, namely they give a porridge or much in the hands of the ultimate consumer with a cold liquid, for instance milk or cream. This property makes the product undesirable since the consumer prefers a flaky fluffy product, with the individual particles separated one from the other, rather than a porridge.

Another disadvantage of the breakfast foods prepared from oats by the processes known in the art for ready-to-eat or quick-cooking cereals, is that they have an undesirable flavor, which is probably associated with the lipoid content of the oat grains. It is a fact that the several known varieties of easy-to-prepare hot cereals, which may be produced from oats by various forms of treatment before and after the gelatinization of the grain material, still have an undesirable aroma and flavor, Thus processes of preparation are known to convert oats into digestible products which require only 3 to 5 minutes cooking in the hands of the housewife. These products, however, although digestible, have an undesirable taste, and the housewife still prefers steel-cut oats and conventional flaked oats which require a half hour or more of cooking.

For the achievement of a good taste and aroma of hot breakfast cereals, from oats, in the present state of the art, the oats are provided in a form which still requires prolonged heating by the ultimate consumer.

For the purpose of improving the taste and aroma of cereal products from oats, it has been proposed to extract the fatty components by solvent extraction, U.S.P. 2,552,291 claims superior results by a defatting step, conducted prior to the cooking operation. According to this patent, the extraction is conducted with solvents such as ethers, alcohols, ketones, hydrocarbons, and the like.

It has now been found, surprisingly, that it is not necessary to remove in a separate step the lipoid portion of the oat groats in order to eliminate the unpleasant taste and aroma. Further, it has been found that removal of the pericarp layer which is located underneath the hull, may be accomplished by simple operations, which also remove the materials responsible for the unpleasant taste.

It is an object of the present invention to provide a quick-cooking cereal product, which can be rapidly converted into tasty cereals comparable to cereals cooked for a prolonged period of time.

It is also an object of this invention to provide a tasty quick-cooking and easily digestible cereal from oats.

Another object is to provide a cereal from oats which after a short cooking period may be treated with a cold liquid, for instance milk or cream, and still retain the identity of particles, rather than giving a porridge.

Another object of the instant invention is to provide a cereal product which has been precooked only to partial gelatinization before it reaches the consumer.

Still another object of this invention is to provide a cereal product which does not lump nor cake in the cooking utensil.

Another object is to provide a process which permits the removal of the starch located under the pericarps prior to the cooking step.

Another object is to provide an inexpensive process for the preparation of the cereal products which are free from undesirable taste.

For simplicity, the invention will be described in connection with the preparation of an instant oatmeal cereal product. However, it is to be understood that the method of the invention is susceptible of application in the preparation of other cereal products using wheat, rye, barley, or other cereal grains, and that it is not intended to restrict the invention to the preparation of quick-cooking oatmeal cereal product.

According to this instant invention, oat groats are soaked in water under efficient agitation. The result of this soaking step is to loosen the pericarp, and at least part of the endosperm usually responsible for the hardness of the product. Repeated rinsing of the product with water provides removal of the pericarp. Substances located on the pericarp, and lipoid materials responsible for unpleasant taste and aroma and some starch are simultaneously removed.

Thus in a simple manner, it is possible by the process of this invention to prepare cereal products even from oats, comparable in aroma with the conventional oatmeal, which still requires prolonged cooking in the hands of the ultimate consumer.

In accordance with an embodiment of this invention, oats are first subjected to a milling operation to remove the outer husk layer. The resulting oat groats still contain a bran layer. The oat groats are then socked in water under agitation.

The temperature of the water is kept desirably between 70° and 80° F., preferably 76° F., but a temperature range of 35° to 230° F. is still satisfactory. The amount of water is at least 5 parts of water per 10 parts of oats and preferably 6 parts of water per 10 parts of oats, or a ratio of 2 parts of water per 3 parts of oats. The proportion of water should not exceed 7 parts per 10 parts of oats.

Efficient means of agitation are necessary during the soaking step, for instance a rotating drum which keeps the oat material in continuous circulation and agitation with the water. However, any means for moving and circulating the soaking water, may be employed.

The period of time necessary to loosen the pericarp, is, to some extent, dependent upon the means of mechanical agitation of the oat groats and the temperature of the water. The soaking step is conducted for at least 5 minutes, but not over 10 hours. If boiling water is used with efficient mechanical agitation, namely in a tank revolving at a rate of 16 r.p.m., a 5-minute soaking period is sufficient.

According to the preferred embodiment, soaking is conducted for 2 hours, with efficient agitation, that is revolving the vessel at a rate of 16 r.p.m.

The presoaked material is then subjected to a rinsing step. The rinsing step must be conducted with sufficient water so as to remove all pericarp, and all the loosened substances which are responsible for the unpleasant aroma.

For 100 pounds of oat groats, 25 gallons of rinsing water over a period of 3 to 5 minutes, is sufficient. The temperature of the rinsing water is perferably 76° F., but ordinary tap water which varies between 65° and 76°, may be used. According to the preferred embodiment of the invention, the rinsing step is conducted in the same drum which has been used for the presoaking step, and immediately thereafter.

The resulting product consists of oats which have been freed of the pericarp and part of the endosperm, and thus of some starches and the lipoids usaully located thereon.

Although the scope of this invention is not to be limited by any theoretical explanation, the lipoids responsible for the unpleasant flavor and aroma are probably phospholipids, which have been isolated from the aqueous layer and rinsings by extraction with either and then have been identified qualitatively as containing organically bound phosphorous.

The oats are then subjected to a cooking step. It is essential, within the scope of the invention, to cook the oats for a period of time sufficient to convert the oats into a product which only requires a short period of cooking in the hands of the ultimate consumer. Prolonged heating, however, is undesirable because the product has a tendency to acquire a pasty unattractive appearance, like a porridge.

In accordance with this instant invention, the cooking step is conducted by subjecting the oats to steaming, until gelatinization just begins. This result is effected by heating the oats at above atmospheric pressure, in an autoclave. It is not necessary to add water, but the amount of water ordinarily present after the soaking and rinsing step, is sufficient. According to the preferred embodiment of the invention, the oat material, after rinsing, is autoclaved for 5 minutes, at a pressure of 15 p.s.i.g. at 250° F. A longer or shorter autoclaving time, varying between 1 and 60 minutes, with a pressure up to 100 p.s.i.g. may be used. For instance a pressure of 30 p.s.i.g. with a temperature of 274° F., for 2.5 minutes, is satisfactory. One of the advantages of the process conducted in accordance with this instant invention, is that the cereal does not lump during autoclaving due to the fact that some starch is removed during the rinsing step.

The autoclaved oats are thereafter dried in two stages, the initial drying step being conducted preferably by air drying for a sufficient period to partially reduce the moisture content to the desired level. Although the drying time may vary between 5 minutes and 6 hours, in the preferred method of operation, the drying time is approximately ¾ hour at a temperature of 90° F. to 100° F. A suitable moisture content for the first stage of the air dried autoclaved oats, is between approximately 16% and 25% by weight. A moisture content above about 25%, tends to produce a nonuniform flaked product when the dried oats are passed through flaking rolls, whereas below about 16%, the flaked product tends to be too brittle. Following the partial drying, the autoclaved oats are tempered, in order to distribute the moisture content uniformly therethrough for at least one-half hour up to 24 hours, in hermetically tight bins. According to the preferred embodiment, the oats are tempered for one hour, a period of time sufficient to distribute the moisture throughout the grain, to improve the resiliency and to render the oat products more suitable for flaking.

The tempered oats are now ready to be cut to suitable size in preparation for the flaking step, or if desired, they may be rolled directly, the former being preferred in the present instance. The tempered oats are usually cut into three or four particles and are then preferably passed over a 20-mesh screen of 0.0331 inch opening. The particles, retained by the screen, are then put through the flaking rolls for final shaping.

Flaking of the cut, tempered oats is carried out in conventional flaking equipment to produce flakes of an average thickness of approximately .0195 inch. Thereafter, the oat flakes are dried in a final drying step, similar to the initial drying step, to reduce the moisture content to about 7% to 12% by weight and preferably 9% to 11%. This cereal product can now be packaged for subsequent use by the consumer.

Cooking the dried oat flakes product in boiling water for only one minute, not over 1½ minutes, produces a hot tasty, and digestible oatmeal product, similar to the conventional oatmeal products, both in appearance and taste. Another advantage is that the product remains flaky and does not lump in the hands of the ultimate consumer.

*Example 1*

One hundred pounds of hulled oat groats were placed in a revolving tank of capacity of 25 gallons, and 70 lbs. of tap water at 72° F. were added. The tank revolved at 16 r.p.m. At the end of 2 hours the oats were rinsed clear with a stream of tap water, for 3 minutes, using a total of 25 gallons of water. The temperature of the rinsing water was 68° F. Thereafter the oats were placed into a pressure cooker and cooked for approximately 5 minutes at 15 p.s.i.g. The cooked oats were then transferred into an air drier and dried for about 40 minutes, at temperature of 110° F. The partially dried oats were transferred into tempering bins where they were kept for 1 hour. The tempered oats were then cut and the fines discarded. The cut oats were transferred to the flaker whereupon flakes were obtained. In the final step, the oats were dried again to a moisture level of 9%.

The resulting product was boiled for 1½ minutes in water with salt added and was then submitted to a taste panel. The consensus of opinion was that the taste and aroma were substantially similar to the characteristics found in conventionally prepared oatmeal.

*Example 2*

Example 1 is repeated, substituting for the oats here used, barley. Substantially similar results are obtained.

*Example 3*

Example 1 is repeated, substituting for the oats there used, rye. Substantially similar results are obtained.

What is claimed is:
1. Process for producing from hulled oats, a quick-cooking breakfast food which is free of starch, fats and oils located on the pericarp of said oats, and which is free of said pericarp, which comprises the steps of:
 (1) soaking said hulled oats to loosen said pericarp at 35° to 230° F., with water, the ratio of water to said oats being between 5 and 7 parts of water per 10 parts of oats, for a period of time betwen 10 minutes and 10 hours
 (2) rinsing said oats to wash out said pericarp together with said fats and starch located thereon, with twice the weight of water, the temperature of the water being between 65° and 75° F.
 (3) autoclaving said residual oats at a pressure between 15 and 100 p.s.i.g., at a temperature of at least 250°

F., for a period of time between 1 and 60 minutes, to incipient gelatinization of the starch of said oats (4) partially drying said oats to a moisture content between 16% and 25%

(5) tempering, flaking, and drying said oats to a moisture content between 7 and 12%, whereby the product may be converted into an edible form by boiling with water for a period of 1 to 1.5 minutes.

2. The process according to claim 1, wherein said soaking is conducted at 70° F. to 80° F. for two hours with water, the ratio of water to said cereals being 2 to 3.

3. A process as set forth in claim 1, wherein the oats, after tempering, are comminuted before the flaking step.

4. The process according to claim 1, wherein said autoclaving is conducted to partial gelatinization of said cereals.

5. The process according to claim 1, wherein said autoclaving is conducted just beyond the point of incipient gelatinization of said cereals.

6. A method as set forth in claim 1, said partial drying step comprising circulating heated air through said gelatinized oats, to decrease the moisture content to between about 16% and 25% by weight, said partial drying being conducted for three-quarters of an hour at a temperature between 90° F. and 110° F.

7. The process according to claim 1, wherein said drying after flaking is conducted until the moisture content is between 9 and 11%.

8. The process according to claim 1, wherein said soaking is conducted in an enclosed chamber, under mechanical agitation, with water at 76° F.

9. The process according to claim 1, wherein said autoclaving is conducted at 15 p.s.i.g. and 250° F., for 5 minutes.

10. The process according to claim 1, wherein said oats after autoclaving are tempered for one hour.

11. The process according to claim 1, wherein the soaking of said oats is conducted in stages.

References Cited by the Examiner

UNITED STATES PATENTS

| | | | |
|---|---|---|---|
| 2,653,009 | 9/1953 | Carman et al. | 99—80.1 X |
| 2,928,743 | 3/1960 | Rutgers | 99—80 |
| 2,930,697 | 3/1960 | Miller | 99—80.1 |

A. LOUIS MONACELL, *Primary Examiner.*

RAYMOND N. JONES, *Examiner.*